United States Patent [19]

Evans et al.

[11] Patent Number: 5,382,002

[45] Date of Patent: Jan. 17, 1995

[54] APPARATUS FOR HEAT TREATING A PARTICULATE MATERIAL

[76] Inventors: Marvin Evans, 8550 N. Fielding Rd.; David H. Miller, 610 E. Birch Ave., both of Milwaukee, Wis. 53217

[21] Appl. No.: 134,529

[22] Filed: Oct. 8, 1993

[51] Int. Cl.6 .............................................. F27B 7/08
[52] U.S. Cl. .................................. 266/205; 266/173; 266/213; 432/112
[58] Field of Search ............... 266/207, 173, 145, 213, 266/205; 432/112

[56] References Cited

U.S. PATENT DOCUMENTS

| | | | |
|---|---|---|---|
| 440,468 | 11/1890 | Clark | 266/173 |
| 528,016 | 10/1894 | Naef | 266/173 |
| 1,358,293 | 11/1920 | Corbould | 266/145 |
| 1,441,351 | 1/1923 | Hindshaw | 266/145 |
| 2,354,100 | 7/1944 | Bowen | 266/173 |
| 3,764,272 | 10/1973 | Sterling | 266/173 |
| 3,830,950 | 8/1974 | Schoumaker et al. | 266/173 |
| 4,200,262 | 4/1980 | Evans et al. | 266/44 |
| 4,201,370 | 5/1980 | Evans et al. | 266/44 |
| 4,337,929 | 7/1982 | Evans | 266/248 |
| 4,510,369 | 4/1985 | Harrison | 219/389 |
| 4,941,822 | 7/1990 | Evans et al. | 432/112 |

Primary Examiner—Scott Kastler
Attorney, Agent, or Firm—Andrus, Sceales, Starke & Sawall

[57] ABSTRACT

An apparatus for heat treating particulate material containing a combustible contaminant. The particulate material is fed into the upstream end of a rotary drum and is conveyed toward the downstream end of the drum. A fixed first tubular member is disposed concentrically within the downstream end of the drum and includes a small diameter inlet section and a larger diameter outlet section. A fuel burner is located within the small diameter end of the first tubular member and combustion gases from the burner travel through the first tubular member to the larger diameter outlet section where the gases expand and are cooled. The gases are then discharged into the upstream end of the drum into contact with the particulate material to vaporize the combustible contaminants. A second tubular member is mounted in radially spaced relation between the first tubular member and the downstream end of the drum to provide inner and outer annular chambers. The vaporized contaminants pass through the inner annular chamber in heat transfer relation with the high temperature section of the first tubular member, thereby providing complete combustion of the contaminants, while the particulate material travels to the downstream end of the drum through the outer annular chamber where it is subjected to a lower temperature which will not adversely effect the particulate material.

17 Claims, 2 Drawing Sheets

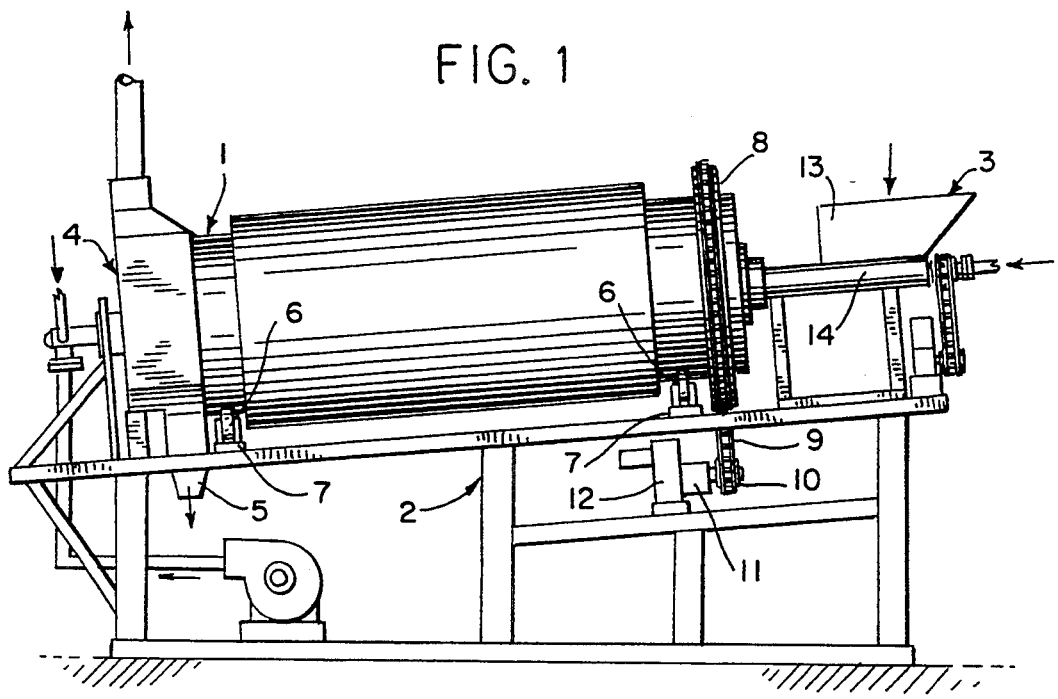
FIG. 1
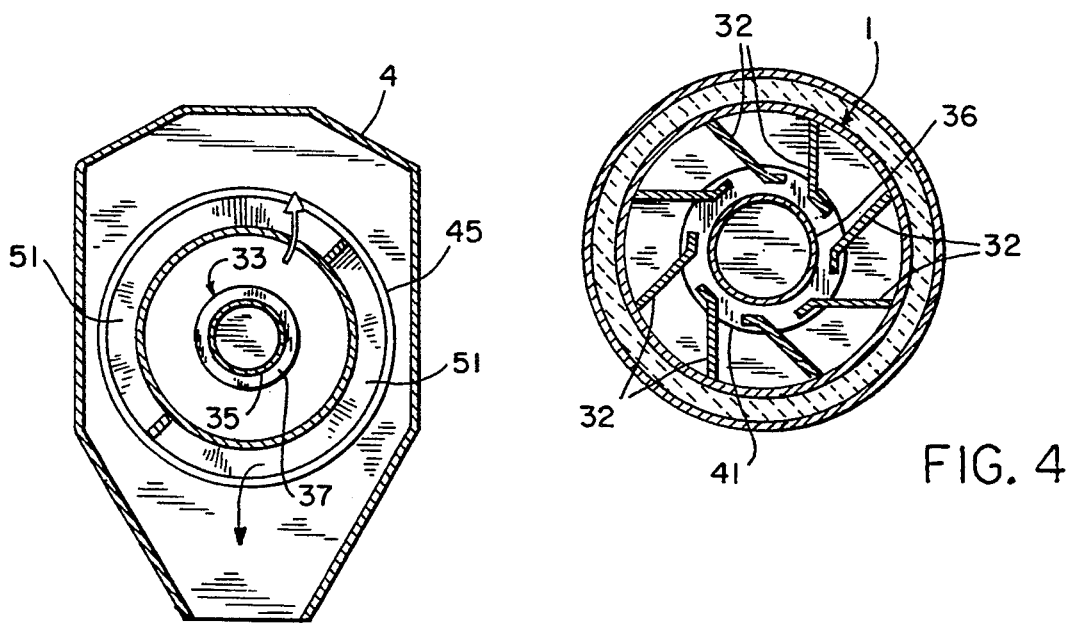
FIG. 3
FIG. 4

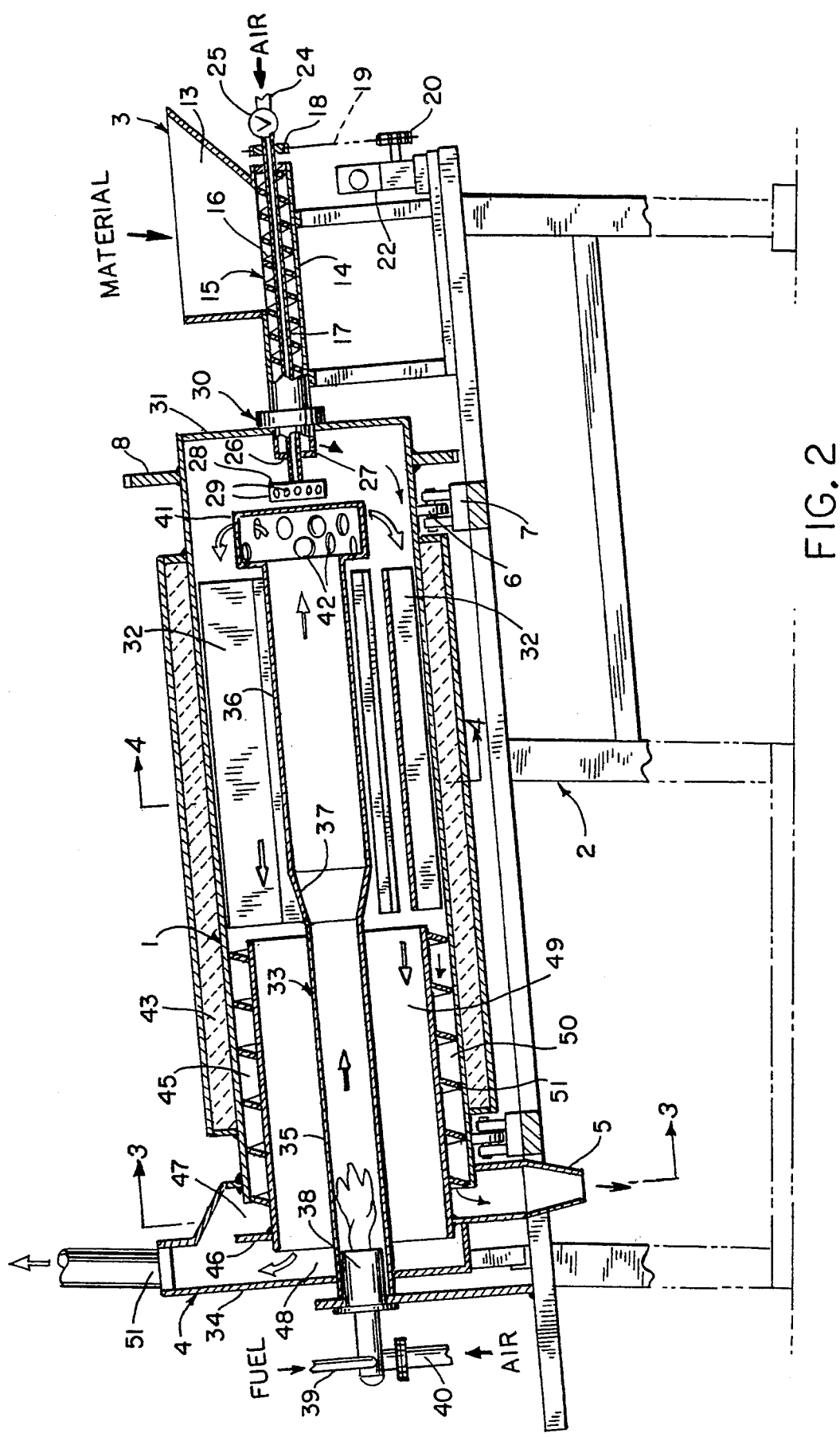

APPARATUS FOR HEAT TREATING A PARTICULATE MATERIAL

BACKGROUND OF THE INVENTION

U.S. Pat. No. 4,941,822 is directed to an apparatus for heat treating contaminated particulate material, such as waste foundry sand, which contains an inorganic binder, such as clay, or organic binders.

In the apparatus of the aforementioned patent, an auger projects into the upstream end of a rotary drum and serves to feed the waste foundry sand into the drum. The auger has a hollow shaft which carries a spiral flight and a blower is connected to the outer end of the shaft and acts to supply air through the shaft into the rotary drum.

In the construction of U.S. Pat. No. 4,941,822, the drum is heated externally by fuel burners and the excess air in the drum burns off the organic contaminants from the particulate material and calcines the mineral contaminants. Thus, the apparatus provides a complete removal of organic and inorganic contaminants from the foundry sand, so that the sand can be reclaimed for further use.

In practice, the apparatus of U.S. Pat. No. 4,941,822 operates at a drum temperature of about 1300° F. The 1300° F. temperature is required in order to have safe auto-ignition of any combustible fuel-air mixture generated within the drum by the process. While this elevated temperature is suitable for treating material, such as foundry sand, it has been found that certain contaminated particulate materials cannot be successfully treated at this temperature. For example, certain metals, such as brass, bronze and aluminum, cannot be heat treated at 1300° F. because the metal surface will oxidize at this temperature and reduce the value of the treated metal. Moreover, contaminated soil containing hydrocarbons cannot by successfully treated at 1300° F. because this temperature will calcine the hydrated mineral soil structure and the calcined soil will lose its ability to enhance plant growth, making the treated soil unsuitable for use.

SUMMARY OF THE INVENTION

The invention is directed to an apparatus for treating particulate material containing contaminants by initially vaporizing the moisture and volatiles in the material in a low temperature section of the apparatus, and then isolating the vapors from the particulate material and thereafter fully combusting the combustible vapors in a high temperature section of the apparatus.

More specifically, the apparatus includes a rotary drum and a particulate material containing organic and-/or inorganic contaminants is fed into the upstream end of the drum.

Located within the downstream end of the drum is a fixed hollow burner tube that includes a small diameter inlet section and a larger diameter outlet section. A fuel burner is mounted in the inlet section of the burner tube and the gases of combustion from the burner flow from the inlet section of the tube to the larger diameter outlet section. The burner flame is confined within the smaller diameter inlet section, thus providing a radiant heating zone, which is at a high temperature of about 1300° F. As the combustion gases flow into the larger diameter outlet section of the burner tube, the gases expand and cool to a lower temperature of about 1000° F. The combustion gases then are discharged from the outlet section of the tube and flow in a reverse downstream direction through the drum in contact with the particulate material to vaporize the moisture and other volatiles in the particulate material. The vapors then pass through an inner annular chamber at the downstream end of the drum in contact with the outer surface of the smaller diameter inlet section of the burner tube, which is at the high radiant temperature of about 1300° F., above the auto-ignition temperature for the combustible gases. At this high temperature, the combustible gases or vapors are completely combusted and are then discharged through a discharge hood.

The particulate material is isolated from the vaporized moisture and volatiles and passes through a separate outer annular chamber at the downstream end of the drum, so that the particulate material is not subjected to the high radiant temperature, thus preventing any high temperature deleterious effect on the particulate material.

As a feature of the invention, the passage of gas through the outer chamber with the particulate material is minimized by utilizing a double pitch spiral flight in the outer annular chamber. The double pitch flight, which rotates with the drum, will convey the particulate material to the downstream end of the drum, but will restrict the flow of gas or volatiles through the outer annular chamber.

The apparatus of the invention has particular application for treating contaminated particulate material that cannot normally tolerate a high temperature of about 1300° F., which is required for full combustion of the combustible material or volatiles in the gas stream. As the combustible materials are completely burned in the drum, the apparatus eliminates the need of an afterburner, thus reducing the overall capital and operating cost of the reclamation system over systems utilizing an afterburner.

The apparatus of the invention has reduced air volume requirements over prior systems and is more energy efficient because the organic contaminants are burned from the particulate material and contribute to the overall fuel requirements of the system.

Other objects and advantages will appear in the course of the following description.

BRIEF DESCRIPTION OF THE DRAWINGS

The drawings illustrates the best mode presently contemplated of carrying out the invention.

In the drawings:

FIG. 1 is a side elevation of the apparatus of the invention;

FIG. 2 is a longitudinal section of the apparatus;

FIG. 3 is a section taken along line 3—3 of FIG. 2; and

FIG. 4 is a section taken along line 4—4 of FIG. 2.

DESCRIPTION OF THE ILLUSTRATED EMBODIMENT

The drawings illustrate an apparatus for heat treating a contaminated particulate material and has particular application for treating particulate materials that will not tolerate temperatures normally necessary for complete combustion of gaseous volatiles.

The apparatus includes an inclined rotary drum 1, which is mounted on a frame 2, and a feeding unit 3 acts to supply a particulate material containing contaminants into the upstream end of the drum. The treated particulate material is discharged from the drum into the lower end of a hood 4 which is located at the downstream end of the drum, and then through a chute 5 to a discharge site, while the combusted gases are discharged from the drum and through a discharge outlet in the upper end of the hood.

To rotate drum 1, two pair of idler rollers 6 are mounted on brackets 7 on frame 2, and act to support the drum for rotation. To rotate the drum 1, a sprocket 8 is mounted on the outer surface of the upstream end of the drum, and is connected by a chain drive 9 to a sprocket 10 mounted on the drive shaft of a gear box or transmission 11, which is driven by a variable speed motor 12. With this construction, operation of the motor will rotate the drum about its longitudinal axis.

Feed unit 3 includes a hopper 13, which is mounted on the upper portion of a cylindrical auger housing 14. The material to be treated is fed into the hopper 13 and passes through an opening into the auger housing 14. Mounted for rotation within housing 14 is an auger 15, including a spiral flight 16 which is mounted on a hollow shaft 17. As best shown in FIG. 2, both the auger 15 and the auger housing project into the upstream end of the drum 1.

To drive the auger 15, a sprocket 18 is mounted on the end of the shaft 17 and is connected through a chain drive 19 to a sprocket 20 on the drive shaft of a variable speed motor 22. Thus, operation of motor 22 will rotate the auger to convey the particulate material through housing 14 and into the upstream end of drum 1.

Air can be supplied to the drum through the hollow auger shaft by a blower, not shown. The outlet of the blower is connected through a conduit 24 to the outer end of the auger shaft and the flow of air through the conduit can be controlled by a valve 25.

The downstream end of the auger housing 14 is closed as indicated by 26, and a discharge opening 27 is formed in the lower portion of the housing 14 adjacent the closed end 26 so that the particulate material will be discharged from the opening 27 into the rotating drum 1.

A diffuser 28 is connected to the downstream end of auger shaft 17 and is provided with a plurality of outlet ports 29 so that air flowing through the shaft 17 will be discharged from the diffuser 28 into the drum.

As the auger housing 14 is fixed and the drum 1 rotates, a rotary seal 30, such as that disclosed in U.S. Pat. No. 4,941,822, can be employed to provide a seal between the end wall 31 of rotating drum and non-rotating auger housing 14.

Located within drum 1 are a plurality of longitudinal baffles 32 that can be provided with bent free ends. As the drum rotates, the baffles tend to engage and lift the particulate material to provide more uniform heating and expose the particulate material to the flow of gas passing through the drum.

In accordance with the invention, a fixed tubular burner member 33 is mounted coaxially within drum 1. The downstream end of tubular member 33 is mounted within the outer wall 34 of hood 4 that is supported on frame 2.

As seen in FIG. 2, burner member 33 includes an inlet section 35 and an outlet section 36 which has a larger diameter than section 35. The two sections 35 and 36 are connected by a tapered intermediate section 37.

A conventional fuel burner 38 which burns a fuel such as natural gas or oil, is mounted in the end of inlet section 35 and fuel is supplied to the burner through a line 39 while air is supplied to the burner from a blower through line 40. A suitable igniter, not shown, is mounted in the burner 38 and acts to ignite the combustible mixture of fuel and air to produce a flame which is confined within the smaller diameter section 35, thus providing a high temperature radiant heating zone surrounding the burner section 35, which in practice has a temperature of about 1300° F. The gases of combustion then flow from the inlet section 35 to the larger diameter outlet section 37, causing expansion and a cooling of gases to a temperature of about 1000° F. The gases are then discharged from the end of section 37 through a diffuser 41 containing a plurality of outlet ports 42.

A layer of refractory material 43 which serves as insulation, is located on the outer surface of drum 1.

The gases of combustion which are discharged through outlet ports 42 in diffuser 41 then flow downstream in the annular area 41 between drum 1 and the section 36 of tubular member 33. As the particulate material is being conveyed along the lower surface of the rotating drum, the gases of combustion in the annular chamber 41 will contact the particulate material and vaporize the moisture and organic volatiles in the particulate material.

Spaced radially outward of the inlet section 35 of burner member 33 is an open-ended tube 45. The upstream end of the tube is located adjacent the intermediate section 37 of burner member 33 while the downstream end of the tube projects beyond the downstream end of the drum 1 and is mounted within an opening in the central wall 46 of hood 5. Wall 46 divides the hood into a pair of chambers 47 and 48. The inner chamber 47 communicates with the downstream end of the drum, while the outer chamber 48 communicates with the tube 45.

The space between tube 45 and the inlet section 35 of burner member 33 defines an inner annular chamber 49, while the space between the tube 45 and the inner surface of drum 1 defines an outer annular chamber 50. The vaporized organics and moisture from the particulate material pass through the inner chamber 49 into the hood chamber 48 and are then discharged through the duct 51 in the upper end of the hood. In passing through the inner chamber 49, in contact with the outer surface of small diameter tube section 35, the vaporized organics are subjected to a high temperature of about 1300° F., above the auto-ignition temperature of the combustibles in the gas, resulting in complete combustion of the organic vapors so that no afterburner is required.

The particulate material, after vaporization of the volatiles, passes through the outer chamber 50 where it is not subjected to the high radiant temperature which is obtained in the inlet section 35 of the burner member 33, and the particulate material is then discharged from the downstream end of drum 1 through the chute 5 in the lower end of the hood 4 to a suitable disposal site.

To prevent the gases or vapors from passing from chamber 41 through the outer chamber 50, a double flight auger 51 or screw is mounted on the inner surface of drum 1 and rides against the outer surface of fixed tube 45. The auger 51 acts to convey the particulate material along the lower surface of the drum to the lower end of hood 4 and then to chute 5, while minimizing the volume of gas that passes through the outer chamber 50. The use of a double flight is important in that it results in less open area between the spiral flights and thus reduces the flow of gas through the outer chamber.

The apparatus of the invention is particularly useful in treating particulate material that cannot be exposed to an elevated temperature that is necessary to completely combust the organic constituents in the contaminate. For example, certain metals such as brass, bronze or aluminum, if subjected to a temperature of about 1300° F. which is necessary to completely combust the organic constituents, will tend to oxidize, thus reducing the value of the treated metallic material. In addition, soil which may be contaminated with oil or other organic materials cannot be subjected to the elevated temperature of 1300° F. because the soil will tend to calcine at this temperature, which will reduce its value as a plant growing medium. However, with this invention, materials of this type can be successfully treated because the particulate material, after vaporization of the organic constituents is separated from the vapors, and the vaporized organic constituents are then subjected to the higher radiant temperature of inlet section 35 of the burner member 33, while the particulate material passes through outer chamber 50 and is not exposed to the high temperature of the inlet section 35.

As the organic materials associated with the particulate material are completely combusted, the need for an afterburner is eliminated and this reduces the overall capital and operating cost of the system.

With the system of the invention, there is no direct flame impingement on the particulate material with the result that there is no surface fusion of foreign materials onto the particulate material.

Various modes of carrying out the invention are contemplated as being within the scope of the following claims, particularly pointing out and distinctly claiming the subject matter which is regarded as the invention.

We claim:

1. An apparatus for heat treating a particulate material containing combustible contaminates, comprising a rotary drum having an upstream end and a downstream end, drive means for rotating the drum, feeding means for feeding a particulate material containing combustible contaminates into the upstream end of the drum, a first tubular member disposed in the downstream end of the drum and extending a substantial distance of the length of the drum, said first tubular member having an inlet section disposed adjacent the downstream end of the drum and having an open outlet section disposed adjacent the upstream end of the drum and communicating with the interior of the drum, said outlet section having a greater cross section area than the inlet section, fuel burner means for introducing hot combustion gases into the inlet section of said first tubular member, said gases flowing from the inlet section to the outlet section and thereby expanding to cool said gases, and a second tubular member spaced radially between said drum and the inlet section of said first tubular member, the space between the drum and said second tubular member defining an outer annular chamber and the space between the second tubular member and the inlet section defining an inner annular chamber, said combustion gases being discharged from the open end of said outlet section of said first tubular member and flowing in a reverse direction to the downstream end of the drum in contact with said particulate material to volatilize the contaminates on said particulate material, means for flowing said volatilized contaminates through the inner chamber in contact with the inlet section of said first tubular member to completely combust said contaminates, and means for flowing the particulate material through said outer chamber to the downstream end of the drum.

2. The apparatus of claim 1, and including means in said outer chamber for restricting the flow of gas therethrough.

3. The apparatus of claim 1, wherein said first tubular member includes a tapered intermediate section connecting said inlet section and said outlet section.

4. The apparatus of claim 1, and including a fixed hood disposed at the downstream end of the drum to receive gases being discharged from said inner chamber.

5. The apparatus of claim 4, and including means for conducting any gas discharged through said outer chamber to said hood.

6. The apparatus of claim 1, wherein said drum is disposed at an inclined angle to the horizontal and the upstream end of the drum is located at a higher level than the downstream end.

7. The apparatus of claim 1, and including air supply means for supplying air to the upstream end of the drum.

8. The apparatus of claim 1, wherein said feeding means comprises a fixed cylindrical housing disposed concentrically of said drum, an auger mounted for rotation within said housing, a hopper communicating with said housing for supplying said particulate material to said auger, said auger being constructed to convey said particulate material into the upstream end of the drum, and second drive means for rotating said auger.

9. The apparatus of claim 4, wherein fuel burner means is mounted on said hood.

10. An apparatus for heat treating particulate material containing a combustible contaminate, comprising a rotary drum having an upstream end and a downstream end, drive means for rotating the drum, feeding means for feeding a particulate material containing a combustible contaminate into the upstream end of the drum, a fixed tubular burner member disposed coaxially within the downstream end of the drum and having an inlet section disposed adjacent the downstream end of the drum and an open outlet section communicating with the interior of the drum, said outlet section having a larger cross sectional area than inlet section, burner means for burning a combustible fuel in the inlet section of said burner member to heat the inlet section to a first high temperature, the gases of combustion flowing from the inlet section to the outlet section and expanding therein to heat the outlet section to a second temperature lower than the first temperature, the gases of combustion flowing through said outlet section and being discharged into said drum and into contact with the particulate material to volatilize said combustible contaminates, means for discharging the particulate material from the downstream end of the drum after volatilization of said contaminates, means for passing the volatilized contaminates in heat transfer relation with said inner section to thereby completely combust said contaminates, means for discharging the completely combusted contaminates from said drum, and means for preventing heat transfer contact between said particulate material and said inlet section.

11. The apparatus of claim 10, wherein the means for preventing heat transfer contact comprises a tubular member spaced radially between the drum and said inlet section and defining an outer chamber between said drum and said tubular member and an inner chamber between said tubular member and said inlet section, said volatilized contaminates flowing through said inner chamber in heat transfer relation with said inlet section to said downstream end to thereby heat said volatilized contaminates and completely combust the same, means for flowing the particulate material through said outer chamber to the downstream end of the drum, and means in said outer chamber for restricting the flow of gas therethrough.

12. The apparatus of claim 11, wherein said means for restricting the flow of gas comprises a spiral flight mounted on the inner surface of the drum and disposed to rotate with the drum in said outer chamber.

13. The apparatus of claim 12, wherein said spiral flight means comprises a double pitch flight.

14. The apparatus of claim 11, and including a tapered intermediate section connecting said inlet section and said outer section.

15. The apparatus of claim 11, and including a fixed discharge hood located at the downstream end of said drum, said inner chamber being in communication with said discharge hood.

16. The apparatus of claim 15, wherein said discharge hood is provided with an internal wall dividing said hood into a first hood section and a second hood section, said inner chamber communicating with said first hood section and said outer chamber communicating with said second hood section.

17. The apparatus of claim 16, and including discharge outlet means for discharging particulate material to a discharge site and communicating with the lower end of said second hood section.

* * * * *